Figure 1:
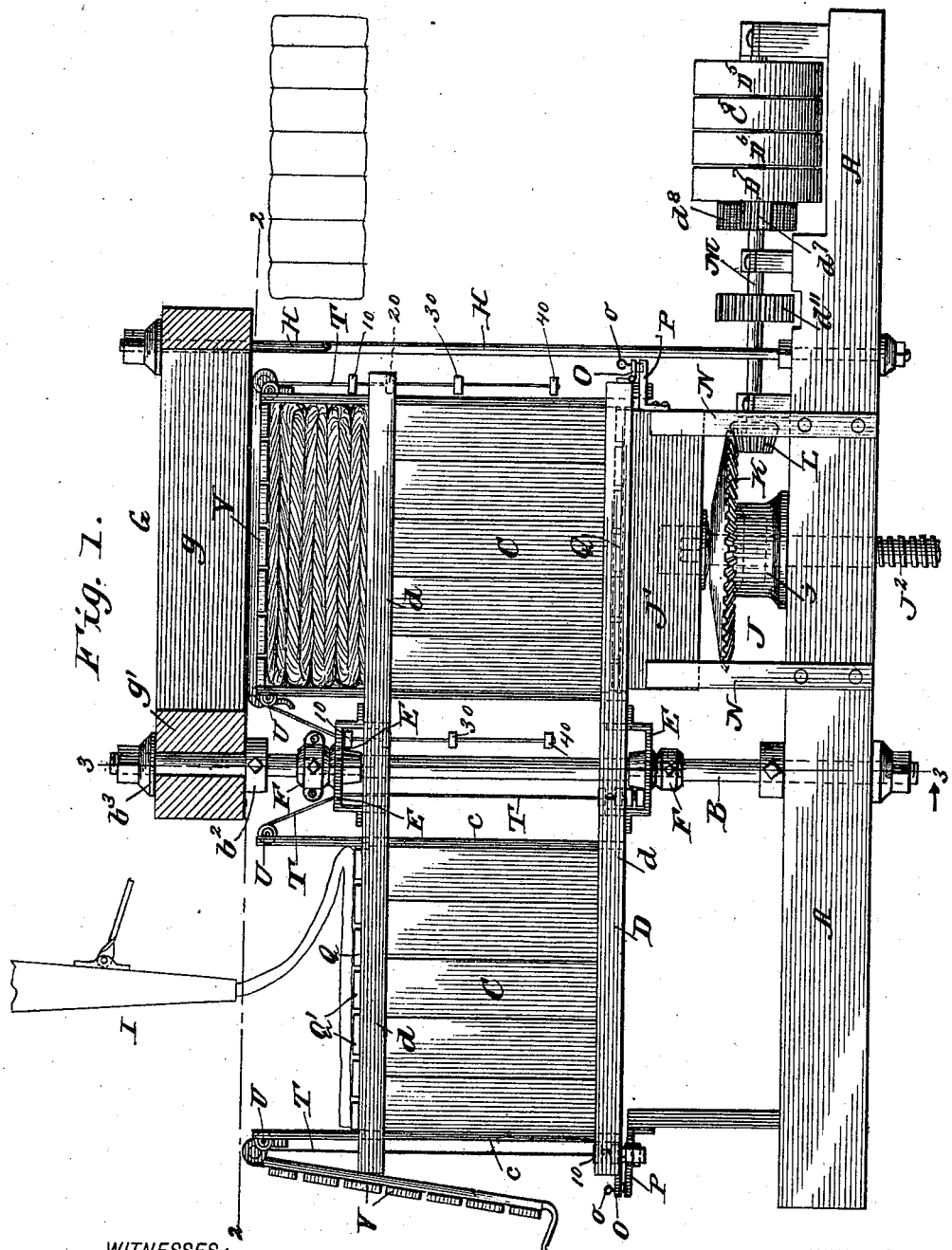

(No Model.)

3 Sheets—Sheet 1.

E. M. IVENS.
BALING PRESS.

No. 502,192.

Patented July 25, 1893.

WITNESSES:
Fred J. Dieterich
W. D. Blondel

INVENTOR:
Edmund M. Ivens.
BY Munn & Co
ATTORNEYS (No Model.)  3 Sheets—Sheet 2.
E. M. IVENS.
BALING PRESS.
No. 502,192. Patented July 25, 1893.
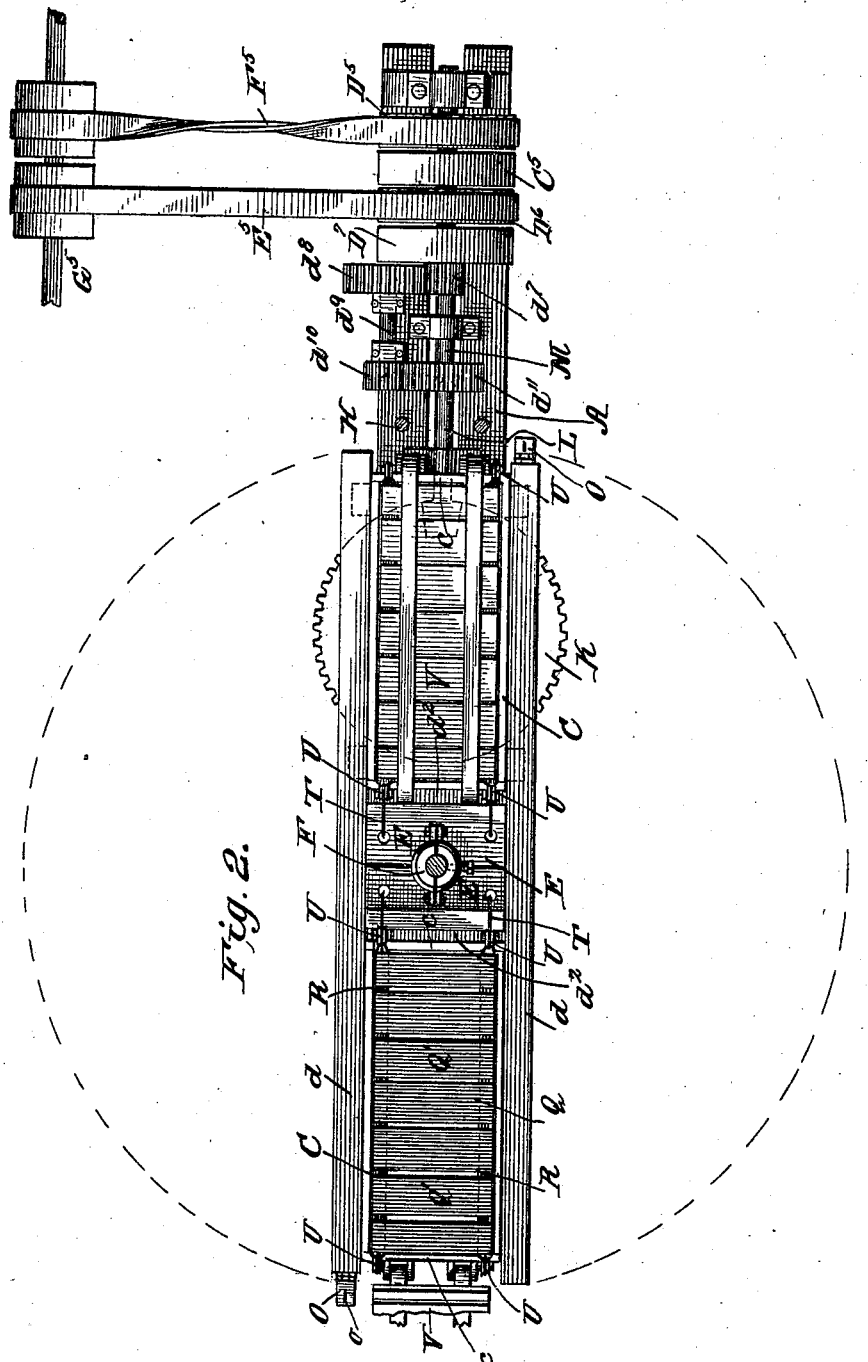
WITNESSES:
Fred G. Dieterich
M. D. Blondel
INVENTOR:
Edmund M. Ivens.
BY
ATTORNEYS (No Model.) 3 Sheets—Sheet 3.
E. M. IVENS.
BALING PRESS.
No. 502,192. Patented July 25, 1893.
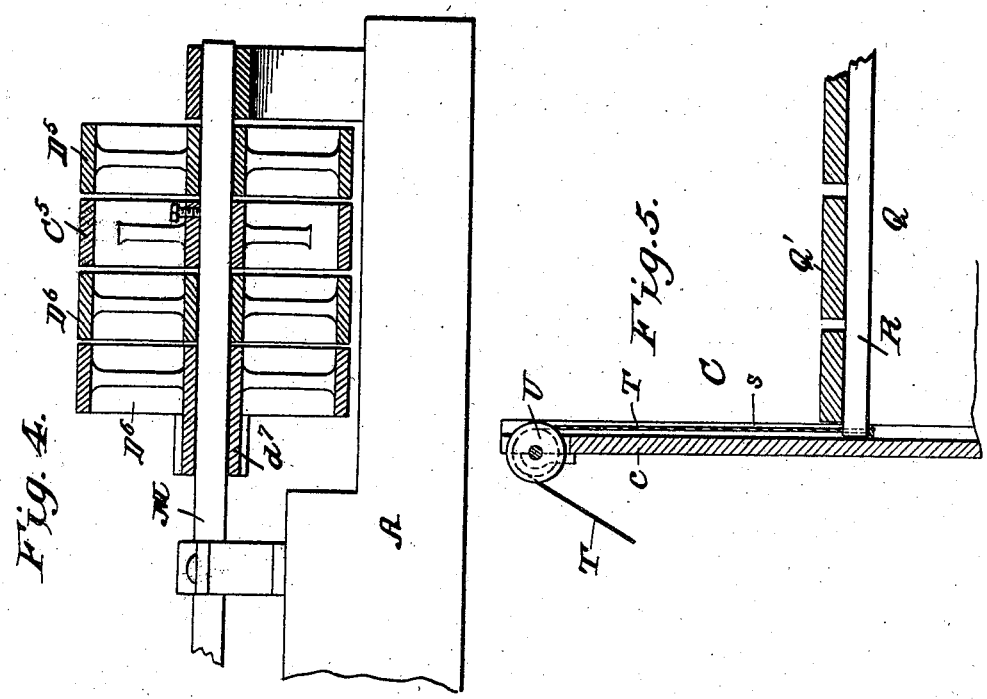
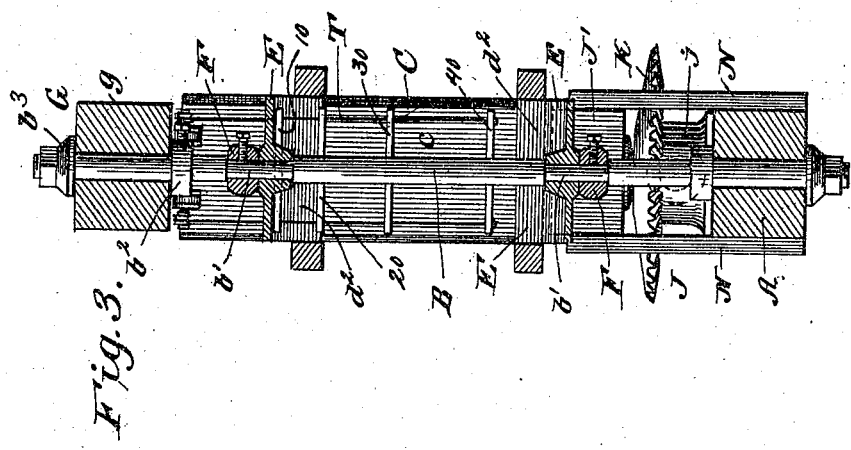
WITNESSES:
Fred G. Dieterich
W. D. Blondel
INVENTOR:
Edmund M. Ivens.
BY 
ATTORNEYS

UNITED STATES PATENT OFFICE.

EDMUND M. IVENS, OF NEW ORLEANS, LOUISIANA, ASSIGNOR TO EMILY L. IVENS, OF SAME PLACE.

BALING-PRESS.

SPECIFICATION forming part of Letters Patent No. 502,192, dated July 25, 1893.

Application filed May 9, 1891. Serial No. 392,240. (No model.)

*To all whom it may concern:*

Be it known that I, EDMUND M. IVENS, residing in the city of New Orleans, Orleans parish, and State of Louisiana, have invented certain new and useful Improvements in Baling-Presses, of which the following is a specification.

My invention relates more particularly to a machine for compressing folded or loose cotton and forming it into bales, and it has for its object to provide a machine of this character which will quickly and effectively compress the cotton into bales of uniform sizes and weight.

My invention consists in the peculiar combination and novel arrangement of the several parts all of which will be hereinafter fully described in the annexed specification and particularly pointed out in the claims, reference being had to the accompanying drawings in which—

Figure 1 is a side elevation of my improved baling press. Fig. 2 is a sectional top plan view thereof on line 2—2, Fig. 1. Fig. 3 is a vertical transverse section of the same on the line 3—3, Fig. 1, and Fig. 4 is a detail view hereinafter referred to. Fig. 5 is a detail section of one end of the cotton box.

In the practical construction of my improved compress I provide a main frame held to rotate about a fixed spindle or strain rod in which are held two chambers which alternately form a cotton receiving and a compressing compartment such main frame being arranged in connection with compressing devices and cotton supplying devices in such a manner that while the cotton in one chamber is being baled the other chamber will be receiving a fresh supply of cotton, and is adapted after the bale is removed to be turned so that the empty chamber will be brought under the cotton supplying devices and the last filled chamber over the compressing devices.

Suitably arranged followers are provided which operate within the cotton chambers and are arranged when down to rest upon the presser platen hereinafter referred to and be pushed upward thereby—such followers being automatically balanced whereby, after the bale is formed and removed, they will remain in their elevated position after the platen recedes, forming as it were, a movable bottom or platform for the empty chamber, and arranged to receive the loose cotton, which as it is fed on the said platform gradually forces it down to the bottom of the chamber, the weight of the cotton necessary to force said follower down being governed by suitably arranged counter balance weights connected therewith in a manner presently described. I also provide suitably arranged operating mechanism whereby to obtain an accumulative power which can be operated by an engine direct or by belts so arranged as to be transferred from a single and rapid operation to a double geared and powerful one so as to attain a great speed for the presser platen at the outset (when cotton offers the least resistance) to save time and to finish more slowly with a powerful pressure on the cotton to thereby obtain a satisfactory density in the cotton in the least possible time.

Having in a general way outlined the construction and arrangement of my improved press, I will now proceed to describe the detail construction thereof.

Referring to the drawings A A indicate longitudinal base timbers, from which projects a fixed spindle or strain rod B, upon which is held to rotate a rectangular frame D, having a pair of cotton boxes or chambers C C, such frame consisting of the upper and lower pair of longitudinal timbers $d\ d$, which are connected at their ends by the cross bars $d'\ d'$ and which are held upon the shaft B in a manner clearly shown in Fig. 3 of the drawings by reference to which it will be seen that to the cross bars $d^2\ d^2$ which centrally connect the timbers D are secured castings E E, which form the bearings which embrace the reduced portions $b'$ of the spindle and which castings are held in place upon the spindle by means of the divided washers F F fixedly held on the spindle, as shown, such construction admitting of an easy rotation and manipulation of the main frame. The upper and lower beams $d$ are further braced by means of the chambers C, which are arranged one near each end of the frame D, and which consist each of a box like frame open at the top and bottom, the end walls $c\ c$ of which extend up beyond the upper edge of the frame D, as shown for a purpose presently described.

G indicates the cross head or fixed platen which is formed of the timbers $g\,g$, which extend over one half of the cotton box frame and which are connected at their inner ends by a cross bar $g'$, which forms a bearing for the upper end of the shaft B, the end $b$ of which is formed with a fixed collar $b^2$, which bears against the under face of the cross bar $g'$, while upon the outer end are fixed a washer and nut $b^3$, whereby the inner end of the platen G is rigidly held in place, the outer end of such platen being rigidly held in position by means of the rods H H, which are secured at their lower ends to the beams A A, as shown.

By reference to Fig. 1 of the drawings it will be seen that one of the cotton chambers C is held under the cotton feeding devices I while the other chamber is held under the platen G, and below the last mentioned chamber are located the compressing devices J which consist of a vertically movable follower J' of a size and form conveniently fitting the cotton chamber, such follower being secured to the upper end of a feed screw $J^2$ guided in bearings $j$ on the base frame A, and upon which is fitted the internally threaded master gear wheel K, which is operated by a bevel gear L on the inner end of an operating shaft M driven in a manner presently described.

N N indicate vertical posts in which the follower J' is guided and upon which it rests when in its lowest position, and O indicates a hinged or gravity latch upon one end of the movable frame D, which is arranged to engage beveled stop lugs or latches P on the base frame A, whereby to automatically stop the frame D when turned to its proper position such latches having eye bolts $o$, which form convenient hand holds for lifting such latches from the catches when desired.

In each of the chambers C is arranged a loose face piece or follower top Q which consists of a series of transverse boards Q' spaced apart, which are bolted to longitudinal metal bars R, as shown, the outer ends of which are attached to the ends of wire ropes or chains T which pass up in recesses $s\,s$ over guide pulleys U and down to the outside of the chambers C, such ends being connected with a series of weights as shown, said weights being arranged to counterbalance the followers; the top weights 10 of each series (which I term the active weights) being always in use to counter balance the follower tops, the remaining weights 20, 30 and 40 being arranged to balance the follower during the process of filling the chamber. By this construction the follower top will remain in its elevated position after the bale has been formed and removed and the platen receded to its normal position, and be held by the balance weights 10. Now when the frame D is turned to bring the just emptied chamber under the cotton feeding devices, the follower will form the platform upon which the cotton is fed, and as soon as the weight of the cotton in the box shall be such as to overcome the dead weights 20, it will move down into the chamber a short distance and raise such weights 20 with it. Such follower top and cotton however will not fall farther until the weight thereof shall successively overcome weights 30 and 40, when all of such weights become active; at which time the box will be full and ready to be swung over to be compressed. It will be readily seen that by this arrangement of the follower top Q and the weights, all of the bales will weight the same, the amount of such weight being governed by the number of weights used to counter balance the said follower, to insure the gradual falling of such follower top and the cotton held thereon, and as may be necessary to hold it to its proper position relative to the cotton feeder.

A hinged cover V is provided for the tops of the chambers C which cover is constructed in substantially the same manner as the follower top, such construction admitting of readily passing the bale ties around the bale when compressed. By providing a hinged top for such chambers as shown I am also enabled to press into the box a slight excess of cotton which might bulge out over the tops of the chambers.

The follower J' is secured upon the end of the feed screw ($J^2$) which is operated by the internally threaded master gear wheel K mounted thereon, which is operated by gear wheel L on the shaft M, and upon such shaft are mounted a fixed pulley $C^5$ and three loose pulleys $D^5$ $D^6$ and $D^7$ the pulleys $D^6$ and $D^7$ being arranged upon the inside of the fixed pulley $C^5$ and upon the loose pulleys $D^5$ $D^6$ normally run drive belts $E^5$ $F^5$, one of which $F^5$ is a crossed belt and both of which are connected with and operated by the main drive shaft $G^5$, suitable belt shifting devices (not shown) in practice being employed in connection with such belts for a purpose presently described.

As before stated at the outset the follower is to be driven quickly against the comparatively loose cotton and at the end of the thrust it is to move slowly but with an increased power. To this end I provide the several loose pulleys and the fast pulley and in connection therewith I employ intermediate gearing, most clearly shown in Figs. 2 and 4 of the drawings, by reference to which it will be seen that upon the inner face of the pulley $D^7$ is formed a gear $d^7$, which meshes with a larger gear $d^8$ on a parallel shaft $d^9$ upon which is mounted a small gear $d^{10}$ which meshes with a larger gear $d^{11}$ on the drive shaft L. Thus should the belts be in the position shown in Fig. 2 and the follower in the position shown in Fig. 1, and it be desired to force the follower up against the follower top and the cotton, the belt $E^5$ will be shifted from the loose pulley $D^6$ to the fast pulley $C^5$, thus giving a direct and rapid motion to the shaft L to operate the screw. Now when the cotton has been compressed nearly to the density desired the belt will be shifted back over the loose pulley $D^6$ to the loose pulley $D^7$, which will transmit motion through the gear $d^7$ to the shaft $d^9$ and through its gear $d^{10}$ to the shaft L, thereby obtaining an accumulative and greatly increased power, the relation of the gears serving to slowly revolve the shaft L and obtain the desired density of the compressed cotton.

Recessing the spindle or central strain rod B at the tops and bottoms of the boxes admits of an exact and rapid transfer of a full box to the baling side, which motion also adjusts instantaneously the filling side for immediate use.

From the foregoing description, taken in connection with the drawings, the advantages of my improved compress will be readily understood.

Having thus described my invention, what I claim, and desire to secure by Letters Patent, is—

1. In a baling press, the combination of the pressing follower the shaft M intermediate connections between said shaft and the follower, a fixed pulley $C^5$ and loose pulleys $D^5$ $D^6$ and $D^7$ on said shaft, a side shaft $d^9$ geared by pinions $d^{10}$ $d^{11}$ with the shaft M and by pinions $d^7$ $d^8$ with the pulley $D^7$, the drive shaft $G^5$ having pulleys, and the straight and crossed belts $E^5$ and $F^5$ connecting the pulleys of the shafts M and $G^5$, all arranged substantially as and for the purpose described.

2. The combination with the main frame, of the strain rod B formed with reduced portions $b$ $b$, the press box mounted on the rod B, the castings E secured to the press box and loosely mounted on the reduced portions of the rods B, and the collars F formed of sections and fixedly secured to the spindle substantially in the manner and for the purpose shown.

EDMUND M. IVENS.

Witnesses:
FRED G. DIETERICH,
SOLON C. KEMON.